United States Patent
Visconti et al.

(10) Patent No.: US 6,508,967 B2
(45) Date of Patent: Jan. 21, 2003

(54) METHOD OF MAKING AN INTERIOR TRIM PANEL

(75) Inventors: Carl Henry Visconti, Clarkston, MI (US); Michael William Jary, Farmington Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 236 days.

(21) Appl. No.: 09/730,899

(22) Filed: Dec. 6, 2000

(65) Prior Publication Data

US 2002/0066973 A1 Jun. 6, 2002

(51) Int. Cl.$^7$ .............................................. B29C 43/18
(52) U.S. Cl. ..................... 264/138; 264/266; 264/267; 264/296; 264/318; 264/334; 425/112; 425/127
(58) Field of Search ................................ 264/138, 266, 264/267, 247, 334, 318, 296; 425/127, 112, 117

(56) References Cited

U.S. PATENT DOCUMENTS 5,968,437 A * 10/1999 Harada ........................ 264/266

FOREIGN PATENT DOCUMENTS

JP                56-93511         *   7/1981

* cited by examiner

Primary Examiner—Jan H. Silbaugh
Assistant Examiner—Edmund H. Lee
(74) Attorney, Agent, or Firm—Kathryn A. Marra

(57) ABSTRACT

A method of making an interior trim panel for attachment to structure of a vehicle includes the steps of loading a trim blank into a cavity of a mold and loading an edge of the trim blank on a movable slide of the mold. The method also includes the steps of depositing a molten thermoplastic material onto a core of the mold and partially closing the mold. The method further includes the steps of moving the slide into a channel of the core, completely closing the mold, and forcing the molten plastic material into a down-turned flange area of the mold to form the interior trim panel with a down-turned flange.

20 Claims, 3 Drawing Sheets

METHOD OF MAKING AN INTERIOR TRIM PANEL

TECHNICAL FIELD

The present invention relates generally to interior trim panels for vehicles and, more particularly, to a method of making an interior trim panel for a vehicle.

BACKGROUND OF THE INVENTION

It is known to provide an interior trim panel for a vehicle to present an aesthetically pleasing appearance in an occupant compartment of the vehicle. The interior trim panel typically includes a trim blank attached to a carrier or substrate by several different conventional processes including adhesives, heat staking, sonic welding, and fasteners. The interior trim panel may be mounted to structure of the vehicle such as an inner door panel of a door for the vehicle by suitable means such as fasteners.

It is also known to use an open-mold process to form a trim panel. Typically, a mold is provided and extrusion deposition compression molding (EDCM) is used to form interior trim panels that do not present "die-lock" conditions during molding, such as a turned-down flange.

Although the above interior trim panel and method of making has worked, it is desirable to provide a method for molding a trim panel with a turned-down flange. It is also desirable to provide an interior trim panel with reduced scrap, improved quality, and fewer manufacturing steps. It is further desirable to reduce the costs associated with the manufacture of an interior trim panel. Therefore, there is a need in the art to provide an improved method of making an interior trim panel for a vehicle.

SUMMARY OF THE INVENTION

It is, therefore, one object of the present invention to provide a new method of making an interior trim panel for a vehicle.

It is another object of the present invention to provide a method of making an interior trim panel with a turned-down flange using ECDM.

It is yet another object of the present invention to provide a method of making an interior trim panel that has less cost.

To achieve the foregoing objects, the present invention is a method of making an interior trim panel for attachment to structure of a vehicle. The method includes the steps of loading a trim blank into a cavity of a mold and loading an edge of the trim blank on a movable slide of the mold. The method also includes the steps of depositing a molten thermoplastic material onto a core of the mold and partially closing the mold. The method further includes the steps of moving the slide into a channel of the core, completely closing the mold, and forcing the molten plastic material into a down-turned flange area of the mold to form the interior trim panel with a down-turned flange.

One advantage of the present invention is that an improved method of making an interior trim panel is provided for a vehicle. Another advantage of the present invention is that the method of making the interior trim panel allows for low-pressure, extrusion deposition compression molding (EDCM) of an interior trim panel with a down-turned flange. Yet another advantage of the present invention is that the method does not require separate adhesion methods because the trim adheres to the flange area due to the molding process, reducing cost. Still another advantage of the present invention is that the method of making the interior trim panel reduces cost and achieves quality benefits over current methods. A further advantage of the present invention is that the method of making the interior trim panel reduces scrap and requires fewer manufacturing steps, resulting in a cost savings.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
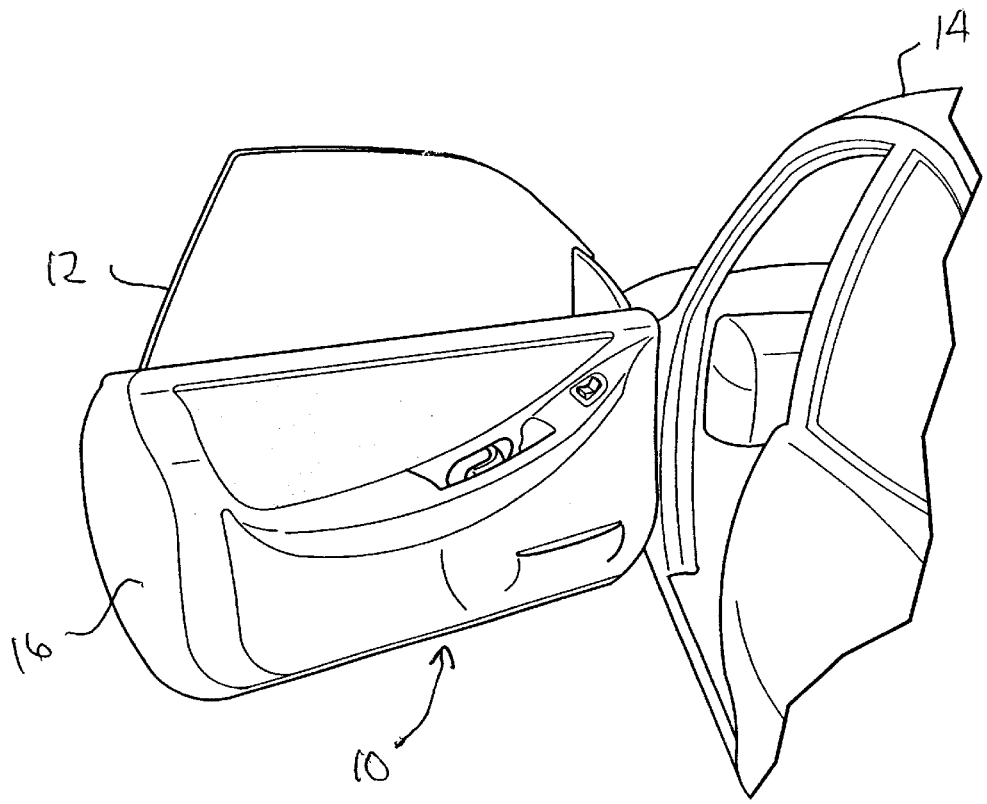
FIG. 1 is a perspective view of an interior trim panel made by a method, according to the present invention, illustrated in operational relationship with a vehicle.

Referring to the drawings and in particular FIG. 1, one embodiment of an interior trim panel 10, according to the present invention, is shown mounted to structure such as a door 12 of a vehicle 14 such as an automotive vehicle. It should be appreciated that, in this example, the interior trim panel 10 is mounted to an inner panel 16 of the door 12. It should also be appreciated that the interior trim panel 10 may be mounted to other structure or panels of the vehicle 14.

Figure 5:
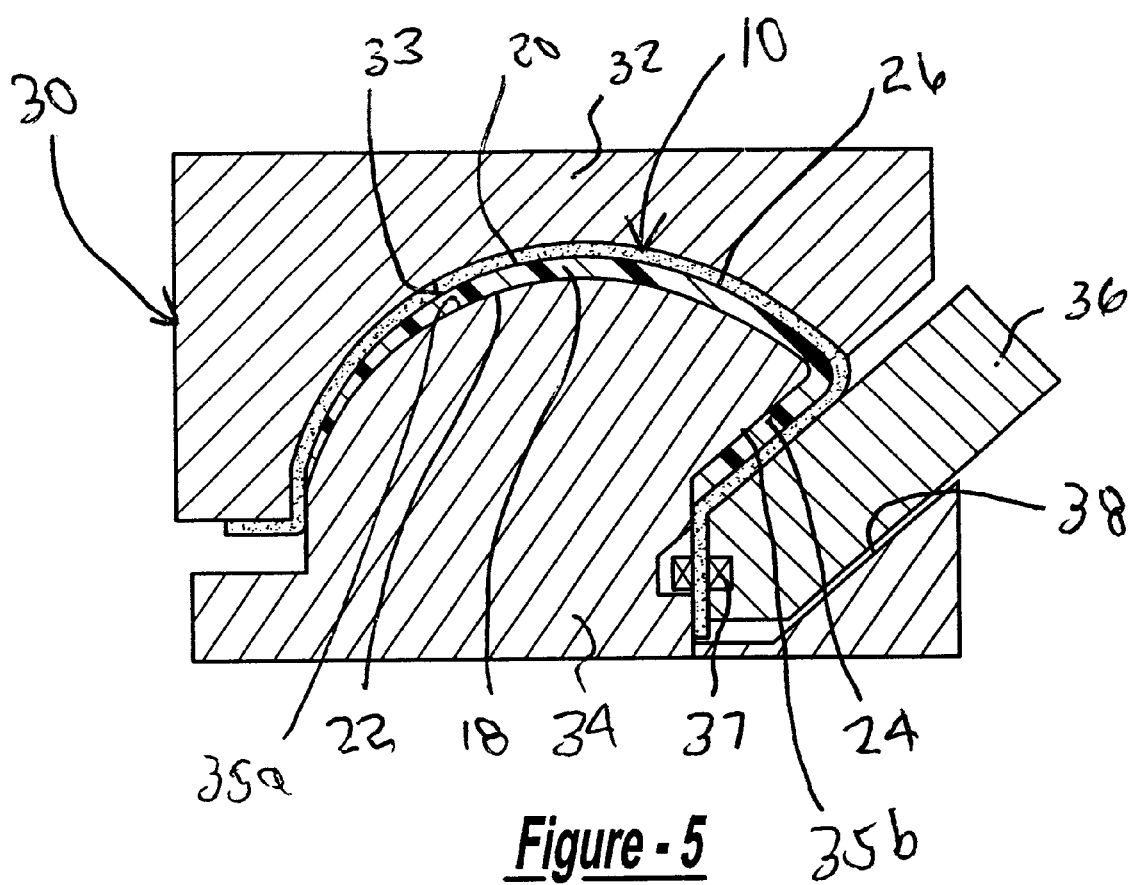
FIG. 5 is a partial fragmentary view of a movable slide of the mold of FIG. 2 illustrated in a third position with the mold completely closed.

Referring to FIGS. 1 and 5, the interior trim panel 10 includes a carrier 18 extending longitudinally and vertically and having a generally rectangular shape. The carrier 18 is made of a thermoplastic material such as polypropylene. The carrier 18 is formed by a method, according to the present invention, to be described. The carrier 18 has a first side 20 and a second side 22. The carrier 18 has a down-turned flange 24 along one side thereof. The second side 22 is attached to the inner panel 16 of the door 12 by suitable means such as fasteners (not shown). It should be appreciated that the down-turned flange 24 is typically located at a top surface of a door trim panel.

The interior trim panel 10 also includes a trim blank 26 incorporated or integrated into the carrier 18. The trim blank 26 extends longitudinally and vertically. The trim blank 26 may be made of at least one of a fabric, cloth, vinyl, TPO (Thermoplastic Polyolifin), leather, carpet material, or other decorative material. Preferably, the trim blank 26 is pre-cut or pre-blanked by a conventional process known in the art. The trim blank 26 is disposed over and bonded to the first side 20 of the carrier 18 by melting and fusion of the plastic material of the carrier 18. It should be appreciated that the trim blank 26 covers the down-turned flange 24 of the carrier 18. It should also be appreciated that the trim blank 26 is a separate piece or component.

Referring to FIGS. 2 through 5, a method, according to the present invention, of making the interior trim panel 10 is disclosed. The method involves extrusion deposition compression molding (EDCM). As illustrated, a mold, generally indicated at 30, includes a first or upper half mold 32 and a second or lower half mold 34. The first half mold 32 is the mold cavity and the second half mold 34 is the mold core. The first half mold 32 has a cavity portion 33 and the second half mold 34 has a core portion 35a and a down-turned flange area 35b. The first half mold 32 and second half mold 34 could be mounted to platens (not shown) of a press (not shown) such as a vertical molding press with sufficient tonnage to accomplish the method to be described with the mold cavity up or cavity down. The first half mold 32 has a trim loading system 37 to accommodate loading of the trim blank 26 as part of an insert molding process and may be a slip frame or manual loading system. The mold 30 also includes a movable slide 36 adjacent the first half mold 32 movable along a channel 38 in the second half mold 34. It should be appreciated that the trim loading system 37 is connected to the slide 36 by suitable means such as fasteners, detents, etc. (not shown). It should also be appreciated that the mold 30 is conventional and known in the art.

Figure 2:
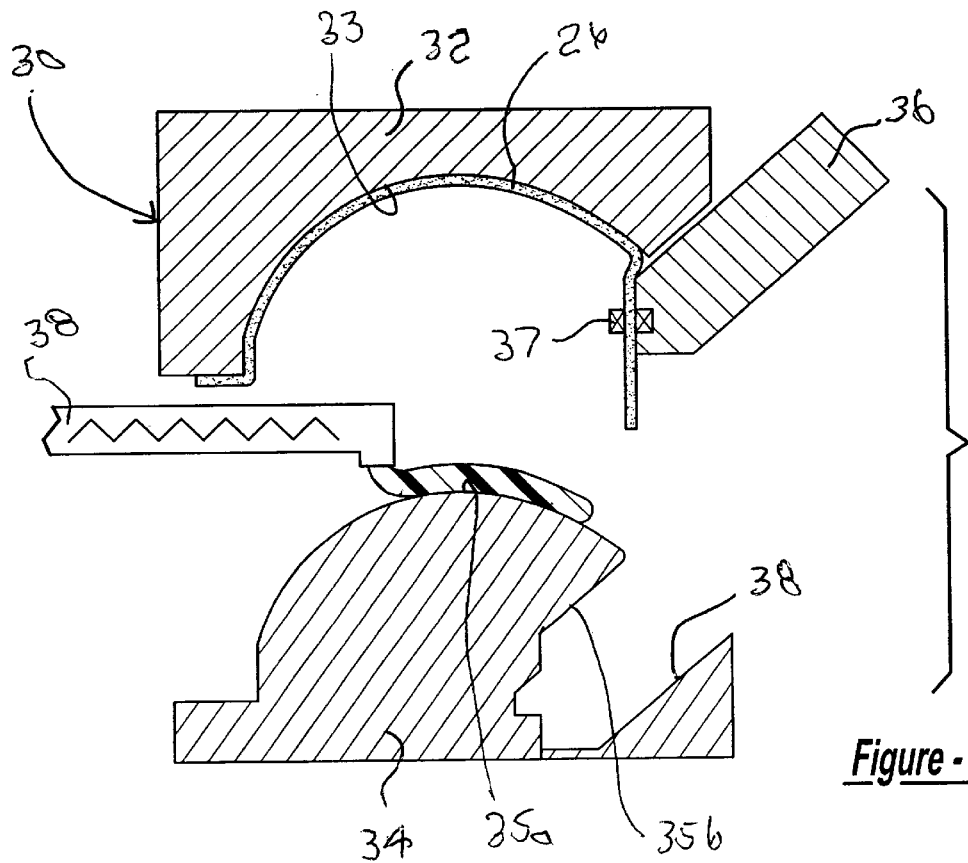
FIG. 2 is a fragmentary side view of a mold used in a method, according to the present invention, of making the interior trim panel of FIG. 1 illustrated in an open position.
Figure 3:
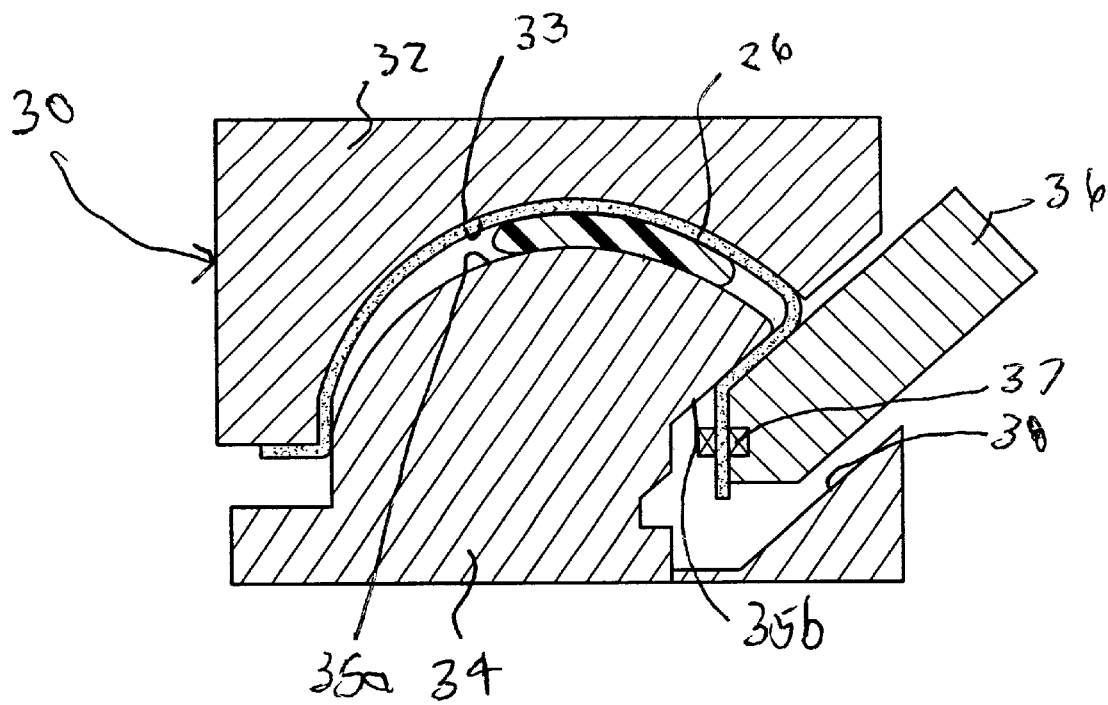
FIG. 3 is a partial fragmentary view of a movable slide of the mold of FIG. 2 illustrated in a first position with the mold partially closed.
Figure 4:
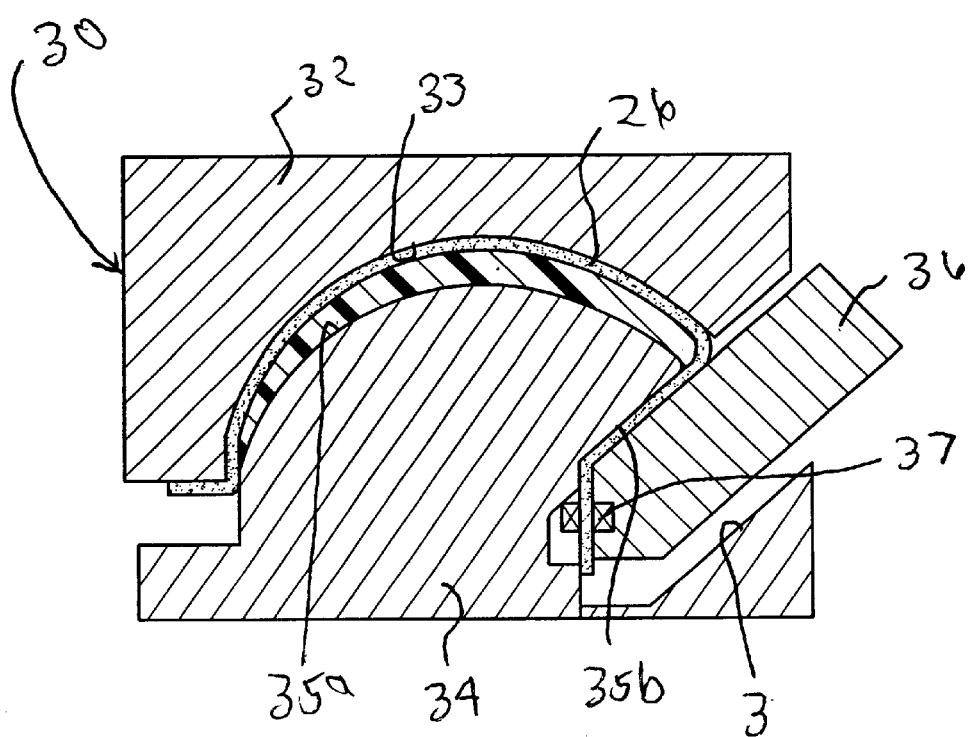
FIG. 4 is a partial fragmentary view of a movable slide of the mold of FIG. 2 illustrated in a second position with the mold partially closed.

The method, according to the present invention, includes the step of loading the trim blank 26 onto the cavity portion 33 of the first half mold 32. The trim blank 26 is pre-cut and loaded onto the cavity portion 33 with an edge associated with the down-turned flange to be formed loaded into the trim loading system 37 on the movable slide 36. The method includes the step of providing a ECDM deposition unit 38 with an extrusion head with at least one axis positioning capability and depositing molten thermoplastic material by extruding a plastic melt as a strand or a sheet onto the mold area or core portion 35 of the second half mold 34 as illustrated in FIG. 2. The method also includes the step of partially closing the mold 30 by moving the first half mold 32 toward the second half mold 34 to a point or position when the movable slide 36 can move just beyond the end of the mold 30, with approximate trim thickness clearance as illustrated in FIG. 3. The method includes the step of moving the slide 36 forward by extending the slide 36 into the channel 38 and forming the trim blank 26 along the down-turned flange area 35b without allowing molten plastic to flow down the edge as illustrated in FIG. 4. The method includes the step of closing the mold 30 completely and causing or forcing the molten plastic or melt to flow into the down-turned flange area 35b of the second half mold 34 and resulting in adhesion to the back of the trim blank 26 while it is formed into shape as illustrated in FIG. 5. The method includes the step of moving the slide 36 by retracting the slide 30. The method includes the step of cooling the mold 30 for a required cooling time and opening the mold 30 and removing the molded interior trim panel 10. It should be appreciated that, although the steps of partially closing the mold 30, moving the slide 36, and completely closing the mold 30 occur sequentially, they occur quickly, with one step starting immediately after the previous step has been completed or starting just before the previous step has been completed in anticipation of completion.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of making an interior trim panel for attachment to structure of a vehicle, said method comprising the steps of:

loading a trim blank into a cavity of a mold and loading an edge of the trim blank on a movable slide of the mold;

depositing a molten thermoplastic material onto a core of the mold;

partially closing the mold;

moving the slide having the edge of the trim blank thereon into a channel of the core thereby forming the trim blank along a down-turned flange area of the mold; and completely closing the mold and forcing the molten thermoplastic material into the down-turned flange area of the mold to form the interior trim panel with a down-turned flange.

2. A method as set forth in claim 1 wherein said step of completely closing includes forming a carrier from the thermoplastic material and bonding the carrier to the trim blank.

3. A method as set forth in claim 1 wherein said step of depositing comprises extruding the thermoplastic material onto the core of the mold.

4. A method as set forth in claim 1 wherein said step of partially closing the mold comprises closing the mold to a point where the movable slide can move just beyond the end of the core of the mold with approximate trim thickness clearance.

5. A method as set forth in claim 1 wherein said step of moving the slide comprises moving the slide forward into the channel and forming the trim blank along the down-turned flange area of the mold without allowing molten plastic to flow down the edge.

6. A method as set forth in claim 1 wherein said step of loading the edge comprises loading the edge of the trim blank associated with the down-turned flange into a slip device on a movable slide.

7. A method as set forth in claim 1 including the step of retracting the slide from the channel after said step of completely closing.

8. A method as set for the in claim 7 including the step of cooling the interior trim panel.

9. A method as set forth in claim 8 including the step of opening the mold.

10. A method as set forth in claim 9 including the step of removing the interior trim panel from the mold.

11. A method as set forth in claim 1 including the step of pre-cutting the trim blank.

12. A method as set forth in claim 1 including the step of starting one step before a previous step has been completed.

13. A method of making an interior trim panel for attachment to an inner panel of a vehicle, said method comprising the steps of:

loading a trim blank into a cavity of a mold and loading an edge of the trim blank on a movable slide of the mold;

depositing a molten thermoplastic material onto a core of the mold;

partially closing the mold to a point where the movable slide can move just beyond the end of the core of the mold with approximate trim thickness clearance;

moving the slide having the edge of the trim blank thereon into a channel of the core thereby forming the trim blank along a down-turned flange area of the mold without allowing molten plastic to flow down the edge; and completely closing the mold and forcing the molten plastic material into a down-turned flange area of the mold to form the interior trim panel with a down-turned flange.

14. A method as set forth in claim 13 wherein said step of completely closing includes forming a carrier from the thermoplastic material and bonding the carrier to the trim blank.

15. A method as set forth in claim 13 wherein said step of depositing comprises extruding the thermoplastic material onto the core of the mold.

16. A method as set forth in claim 13 wherein said step of loading the edge comprises loading the edge of the trim blank associated with the down-turned flange into a slip device on the movable slide.

17. A method as set forth in claim 13 including the step of retracting the slide from the channel after said step of completely closing.

18. A method as set for the in claim 17 including the step of opening the mold.

19. A method as set forth in claim 18 including the step of removing the interior trim panel from the mold.

20. A method of making a door trim panel for attachment to an inner panel of a door of a vehicle, said method comprising the steps of:

loading a trim blank into a cavity of a mold and loading an edge of the trim blank on a movable slide of the mold;

depositing a molten thermoplastic material onto a core of the mold;

partially closing the mold;

moving the slide having the edge of the trim blank thereon into a channel of the core thereby forming the trim blank along a down-turned flange area of the mold; and completely closing the mold and forcing the molten thermoplastic material into the down-turned flange area of the mold to form the door trim panel with a down-turned flange.

\* \* \* \* \*